(12) United States Patent
Sakai (10) Patent No.: US 10,993,159 B2
(45) Date of Patent: Apr. 27, 2021

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/199,947

(22) Filed: Nov. 26, 2018

(65) Prior Publication Data
US 2019/0166537 A1 May 30, 2019

(30) Foreign Application Priority Data
Nov. 27, 2017 (JP) .............................. JP2017-226811

(51) Int. Cl.
| | | |
|---|---|---|
| H04W 36/30 | (2009.01) | |
| H04W 36/08 | (2009.01) | |
| H04W 12/00 | (2021.01) | |
| H04W 36/00 | (2009.01) | |
| H04W 36/26 | (2009.01) | |
| H04W 72/08 | (2009.01) | |
| H04W 88/02 | (2009.01) | |
| H04W 36/14 | (2009.01) | |
| H04W 84/12 | (2009.01) | |
| H04W 36/36 | (2009.01) | |
| H04W 48/18 | (2009.01) | |

(52) U.S. Cl.
CPC ......... *H04W 36/30* (2013.01); *H04W 12/003* (2019.01); *H04W 36/0079* (2018.08); *H04W 36/08* (2013.01); *H04W 36/26* (2013.01); *H04W 72/085* (2013.01); *H04W 72/087* (2013.01); *H04W 36/14* (2013.01); *H04W 36/305* (2018.08); *H04W 36/36* (2013.01); *H04W 48/18* (2013.01); *H04W 84/12* (2013.01); *H04W 88/02* (2013.01)

(58) Field of Classification Search
CPC ............. H04W 36/30; H04W 36/0079; H04W 12/003; H04W 36/08; H04W 36/26; H04W 72/085; H04W 72/087
See application file for complete search history.

(56) References Cited

U.S. PATENT DOCUMENTS

| | | | | |
|---|---|---|---|---|
| 9,210,625 | B1 * | 12/2015 | Lovlekar | H04W 36/0066 |
| 2004/0147262 | A1 * | 7/2004 | Lescuyer | H04W 36/0083 |
| | | | | 455/434 |
| 2005/0076244 | A1 * | 4/2005 | Watanabe | H04W 12/06 |
| | | | | 726/4 |

(Continued)

FOREIGN PATENT DOCUMENTS

| | | |
|---|---|---|
| CN | 105379329 A | 3/2016 |
| CN | 106134257 A | 11/2016 |

(Continued)

*Primary Examiner* — Jael M Ulysse
(74) *Attorney, Agent, or Firm* — Canon U.S.A., Inc. IP Division (57) ABSTRACT

Whether a detected wireless network is capable of connection using a Fast Initial Link Setup (FILS) method is determined, and handover processing for switching a connection destination to the detected wireless network is performed based on the result of determination.

12 Claims, 9 Drawing Sheets

(56) References Cited

U.S. PATENT DOCUMENTS

| | | | |
|---|---|---|---|
| 2007/0064647 A1* | 3/2007 | Prasad | H04L 63/205 370/331 |
| 2009/0124284 A1* | 5/2009 | Scherzer | H04M 1/72572 455/552.1 |
| 2009/0270105 A1* | 10/2009 | Kakumaru | H04W 36/36 455/436 |
| 2009/0280812 A1* | 11/2009 | Cheng | H04W 76/27 455/436 |
| 2013/0176897 A1* | 7/2013 | Wang | H04W 88/08 370/254 |
| 2014/0185469 A1* | 7/2014 | Marmolejo-Meillon | H04W 36/30 370/252 |
| 2014/0254502 A1* | 9/2014 | Cai | H04W 48/20 370/329 |
| 2014/0280901 A1* | 9/2014 | Balachandran | H04W 24/04 709/224 |
| 2015/0009802 A1* | 1/2015 | Wager | H04W 76/19 370/218 |
| 2015/0036594 A1* | 2/2015 | Kneckt | H04W 76/10 370/328 |
| 2015/0282064 A1* | 10/2015 | Patil | H04W 48/10 370/329 |
| 2015/0350974 A1* | 12/2015 | Patil | H04W 36/00837 370/331 |
| 2016/0081130 A1 | 3/2016 | Wang | |
| 2016/0112944 A1* | 4/2016 | Zhou | H04W 48/20 370/338 |
| 2016/0262090 A1* | 9/2016 | Marin | H04W 74/0816 |
| 2016/0374118 A1* | 12/2016 | Mestanov | H04W 8/005 |
| 2017/0079078 A1* | 3/2017 | Wang | H04W 12/04031 |
| 2017/0238228 A1* | 8/2017 | Zhang | H04W 36/08 370/331 |
| 2017/0318614 A1* | 11/2017 | Wang | H04W 48/08 |
| 2018/0041930 A1* | 2/2018 | Hampel | H04L 63/10 |
| 2018/0183662 A1* | 6/2018 | Likar | H04W 48/20 |

FOREIGN PATENT DOCUMENTS

| | | | | |
|---|---|---|---|---|
| EP | 1513361 A1 | * | 3/2005 | H04W 36/365 |
| JP | 2011-217078 A | | 10/2011 | |
| WO | 2013/181852 A1 | | 12/2013 | |

* cited by examiner

COMMUNICATION APPARATUS, METHOD FOR CONTROLLING COMMUNICATION APPARATUS, AND STORAGE MEDIUM

BACKGROUND OF THE INVENTION

Field of the Invention

The present invention relates to a communication apparatus which connects to a base station.

Description of the Related Art

There has been formulated the Institute of Electrical and Electronics Engineers (IEEE) 802.11ai standard (hereinafter, 11ai) for speeding up connection between a wireless local area network (LAN) base station (access point (AP)) and a terminal apparatus (station (STA)). Fast Initial Link Setup (FILS) for shortening connection processing between an STA and an AP is standardized in 11ai. Japanese Patent Application Laid-Open No. 2011-217078 discusses a configuration for performing handover processing in which an STA switches its connection destination AP by using a FILS method.

If the FILS method can be used and an AP more appropriate than the currently-connected one is detected like an AP having a higher reception signal intensity, the STA can automatically perform a handover. In an actual environment, APs to which a handover can be made may include both a FILS-capable AP and a not FILS-capable one.

If, in such an environment, the STA automatically performs a handover to the not FILS-capable AP, connection processing is performed by a conventional method with several seconds of communication-disabled time. In such a case, for example, a communication application may terminate with an error due to timeout, or throughput may drop.

SUMMARY OF THE INVENTION

The present invention is directed to enabling performing handover processing in consideration of whether a handover designation wireless network is capable of connection using the FILS method.

According to an aspect of the present invention, a communication apparatus includes one or more processors, and one or more memories including instructions that, when executed by the processor(s), cause the communication apparatus to detect, when in connection with a first wireless network, a second wireless network different from the first wireless network, determine, in a case where the second wireless network is detected, whether the second wireless network is capable of connection using a Fast Initial Link Setup (FILS) method, determine, based on a result of the determination, whether to perform handover processing for switching a connection destination from the first wireless network to the second wireless network, and perform the handover processing in a case where the handover processing is determined to be performed.

Further features of the present invention will become apparent from the following description of exemplary embodiments with reference to the attached drawings.

DESCRIPTION OF THE EMBODIMENTS

Figure 1:
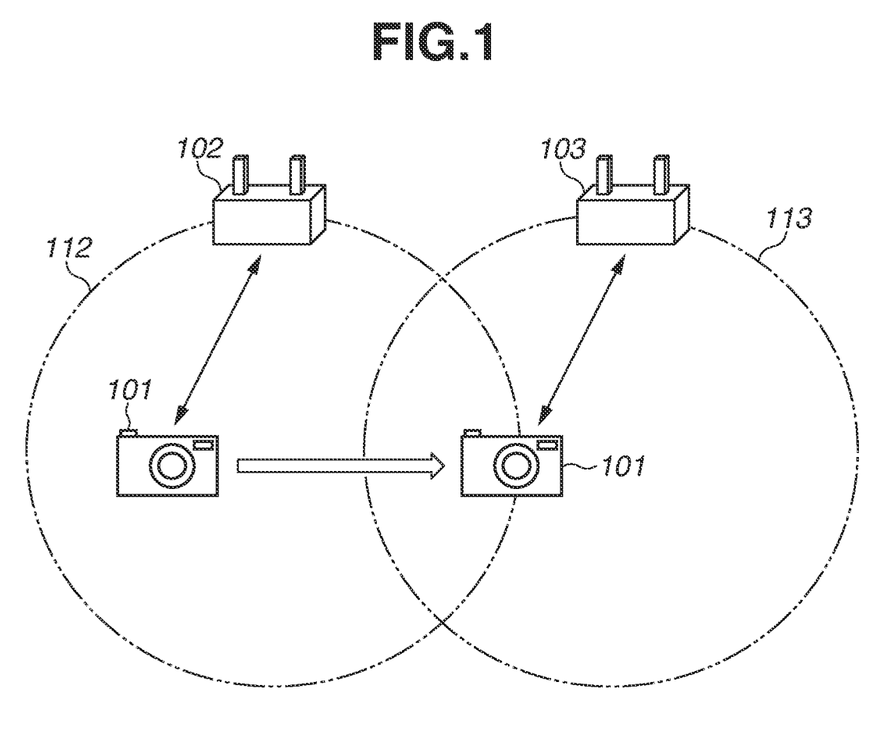
FIG. 1 is a system configuration diagram.

A communication apparatus according to a first exemplary embodiment will be described in detail below with reference to the drawings. FIG. 1 illustrates a configuration of a communication system according to the present exemplary embodiment. The communication system according to the present exemplary embodiment includes a communication apparatus 101, a base station 102, and a base station 103.

For example, the communication apparatus 101 may be an image input apparatus such as an imaging apparatus (camera or video camera) and a scanner. The communication apparatus 101 may be an image output apparatus such as a printer (single function printer (SFP) or multi-function printer (MFP)), a copying machine, and a projector. The communication apparatus 101 may be a storage device such as a hard disk drive and a memory device, or an information processing apparatus such as a personal computer and a smartphone.

The communication apparatus 101 and the base stations 102 and 103 perform wireless communication compliant with at least any one of the Institute of Electrical and Electronics Engineers (IEEE) 802.11 series standards.

The base station 102 operates as an access point (AP) compliant with the IEEE 802.11 series standard and constructs a wireless network 112 (hereinafter, network 112). The base station 102 may operate as a group owner compliant with the Wi-Fi Direct standard (Wi-Fi Peer-to-Peer standard) and construct the network 112.

The base station 103 operates as an AP and constructs a wireless network 113 (hereinafter, network 113). The base station 103 may operate as a group owner compliant with the Wi-Fi Direct standard and construct the network 113.

The base stations 102 and 103 support IEEE 802.11ai (hereinafter, 11ai). The communication apparatus 101 can thus perform connection processing, using the Fast Initial Link Setup (FILS) method, with the wireless networks 112 and 113 constructed by the respective base stations 102 and 103. FILS, defined in 11ai, is a method for speeding up processing equivalent to conventional Wi-Fi Protected Access (WPA)-Enterprise authentication processing and Dynamic Host Configuration Protocol (DHCP)-based Internet Protocol (IP) address assignment processing and enabling execution of connection processing.

The communication apparatus 101 can operate as a station (STA) compliant with the IEEE 802.11 series standard and perform connection processing using the FILS method with the wireless networks 112 and 113 constructed by the base stations 102 and 103. The communication apparatus 101 can also perform connection processing using WPA-Enterprise.

The communication apparatus 101 can perform handover processing for switching the base station to be connected (for example, switching the connection destination from the base station 102 to the base station 103). As employed herein, the use of the FILS method for connection processing with the switched (new destination) wireless network during handover processing will be referred to as handover processing using FILS. Use of WPA-Enterprise for connection processing with the switched (new destination) wireless network will be referred to as handover processing using WPA-Enterprise. The handover processing using WPA-Enterprise includes IP address assignment processing by DHCP.

In the present exemplary embodiment, the same network identifier is set for the networks 112 and 113. An example of the network identifier is a service set identifier (SSID).

Figure 2:
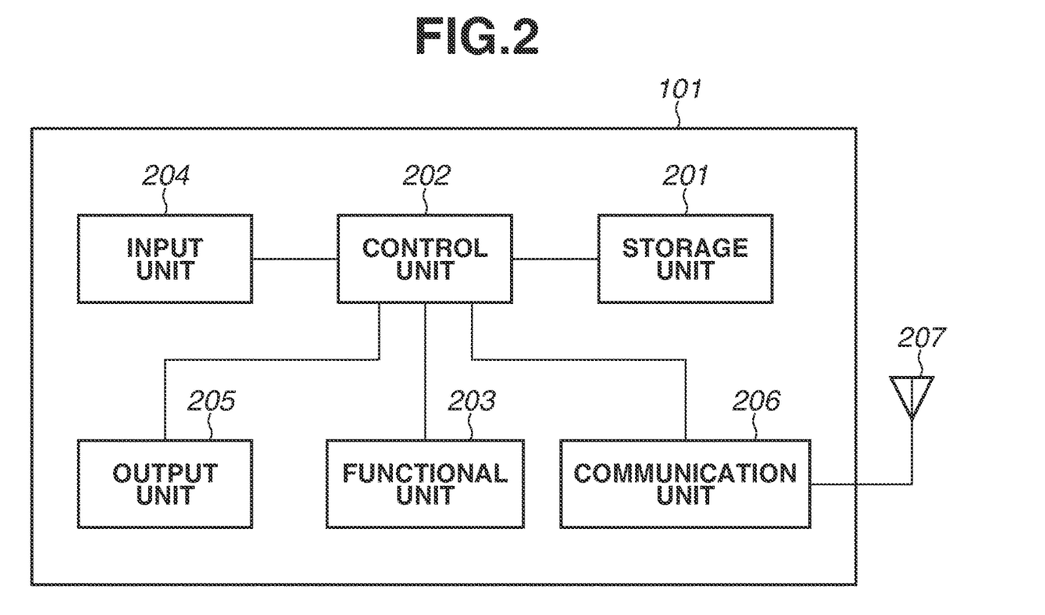
FIG. 2 is a hardware configuration diagram of a communication apparatus.

FIG. 2 illustrates a hardware configuration of the communication apparatus 101.

A storage unit 201 includes a memory such as a read-only memory (ROM) and a random access memory (RAM). The storage unit 201 stores programs for performing various operations to be described below, and various types of information such as a communication parameter for wireless communication. Aside from a ROM and a RAM, recording media such as a flexible disk, a hard disk, an optical disk, a magneto-optical disk, a Compact Disc Read-Only Memory (CD-ROM), a Compact Disc-Recordable (CD-R), a magnetic tape, a nonvolatile memory card, and a digital versatile disc (DVD) may be used as the storage unit 201. The storage unit 201 may include a plurality of memories.

A control unit 202 includes a processor such as a central processing unit (CPU) and a microprocessing unit (MPU). The control unit 202 controls the entire communication apparatus 101 by executing the programs stored in the storage unit 201. The control unit 202 may control the entire communication apparatus 101 through cooperation of the programs stored in the storage unit 201 and an operating system (OS). The control unit 202 may include a plurality of processors like multi-core processors, and control the entire communication apparatus 101 by the plurality of processors.

The control unit 202 controls a functional unit 203 to perform predetermined processing such as imaging, printing, and projection. The functional unit 203 is hardware for the communication apparatus 101 to perform predetermined processing. For example, if the communication apparatus 101 is a camera, the functional unit 203 is an imaging unit and performs imaging processing. For example, if the communication apparatus 101 is a printer, the functional unit 203 is a printing unit and performs print processing. For example, if the communication apparatus 101 is a projector, the functional unit 203 is a projection unit and performs projection processing. Data to be processed by the functional unit 203 may be data stored in the storage unit 201 or data communicated from another communication apparatus via a communication unit 206 to be described below.

An input unit 204 accepts various operations from a user. An output unit 205 makes various outputs to the user. The outputs of the output unit 205 include at least one of the following: display on a screen, an information output using a liquid crystal display (LCD) or a light-emitting diode (LED), an audio output from a speaker, and a vibration output. Both the input unit 204 and the output unit 205 may be implemented by one module like a touch panel.

The communication unit 206 performs control on wireless communication compliant with the IEEE 802.11 series standard and performs control on Transmission Control Protocol (TCP)/IP communication. The communication unit 206 may perform control on User Datagram Protocol (UDP) communication instead of or in addition to TCP communication.

The communication unit 206 controls an antenna 207 to transmit and receive wireless signals for wireless communication. The communication apparatus 101 communicates contents such as image data, document data, and video data with other communication apparatuses (base stations and apparatuses connected over the base stations) via the communication unit 206. The communication unit 206 may also be capable of communications compliant with other communication standards such as Bluetooth (registered trademark), near field communication (NFC), and the Ethernet.

Figure 3:
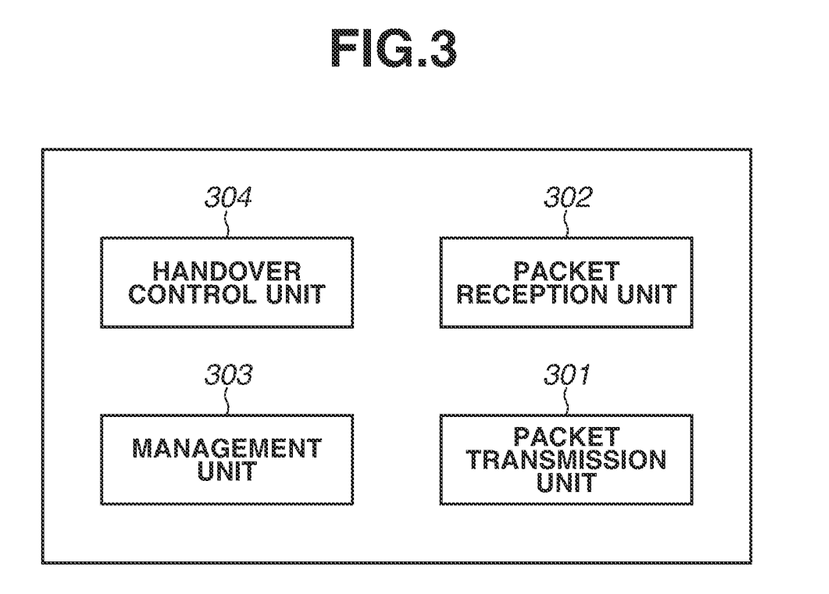
FIG. 3 is a software function block diagram of the communication apparatus.

FIG. 3 illustrates software function blocks implemented by the control unit 202 of the communication apparatus 101 reading programs stored in the storage unit 201. At least part of the software function blocks illustrated in FIG. 3 may be implemented by hardware. In the case of hardware implementation, for example, dedicated circuits may be generated from the programs for implementing the respective function blocks on a field programmable gate array (FPGA) by using a predetermined compiler, and the generated dedicated circuits may be used as hardware modules having the functions of the corresponding software modules. Like an FPGA, gate array circuits may be formed for hardware implementation.

A packet transmission unit 301 packetizes transmission data the communication apparatus 101 transmits into packets compliant with the IEEE 802.11 series standard, and transmits the packets to a partner apparatus or apparatuses (here, the base stations 102 and 103) via a wireless network. A packet reception unit 302 receives packets compliant with the IEEE 802.11 series standard from the partner apparatus(es) (here, the base stations 102 and 103) via the wireless network, and obtains data included in the packets. The packet transmission unit 301 and the packet reception unit 302 transmit and receive packets by using the communication unit 206.

A management unit 303 manages communication parameters for connecting to the networks 112 and 113. Communication parameters include an operation channel of a wireless network, an identifier (for example, SSID) of the wireless network, an encryption key (for example, passphrase) used in the wireless network, and information about an encryption method and authentication method used in the wireless network. The communication parameters may include only some of the pieces of such information. The communication parameters for connecting to the networks 112 and 113 may be referred to as communication parameters for connecting to the base stations 102 and 103.

The management unit 303 further manages reception signal intensities from the base stations 102 and 103, and threshold information about the reception signal intensities. The management unit 303 manages such information by using the storage unit 201. The threshold information will be described to be stored in the storage unit 201 in advance. However, this is not restrictive. The threshold information may be settable by the user, or obtainable from a base station or an external apparatus.

A handover control unit 304 determines whether to switch the wireless network to be connected, based on management signals received from base stations around and parameter information stored in the communication apparatus 101. The handover control unit 304 performs the handover processing for switching the wireless network to be connected based on the determination. The handover control unit 304 may further be able to perform processing for reconnection to the originally-connected wireless network if the handover processing fails.

The handover processing includes disconnection processing by which the communication apparatus 101 disconnects from the wireless network in connection, and connection processing by which the communication apparatus 101 connects to the new wireless network to be connected. Here, the handover control unit 304 supports connection processing both for connection using the WPA-Enterprise method and for connection using the FILS method. The handover control unit 304 performs the handover processing by using the communication unit 206.

Figure 4:
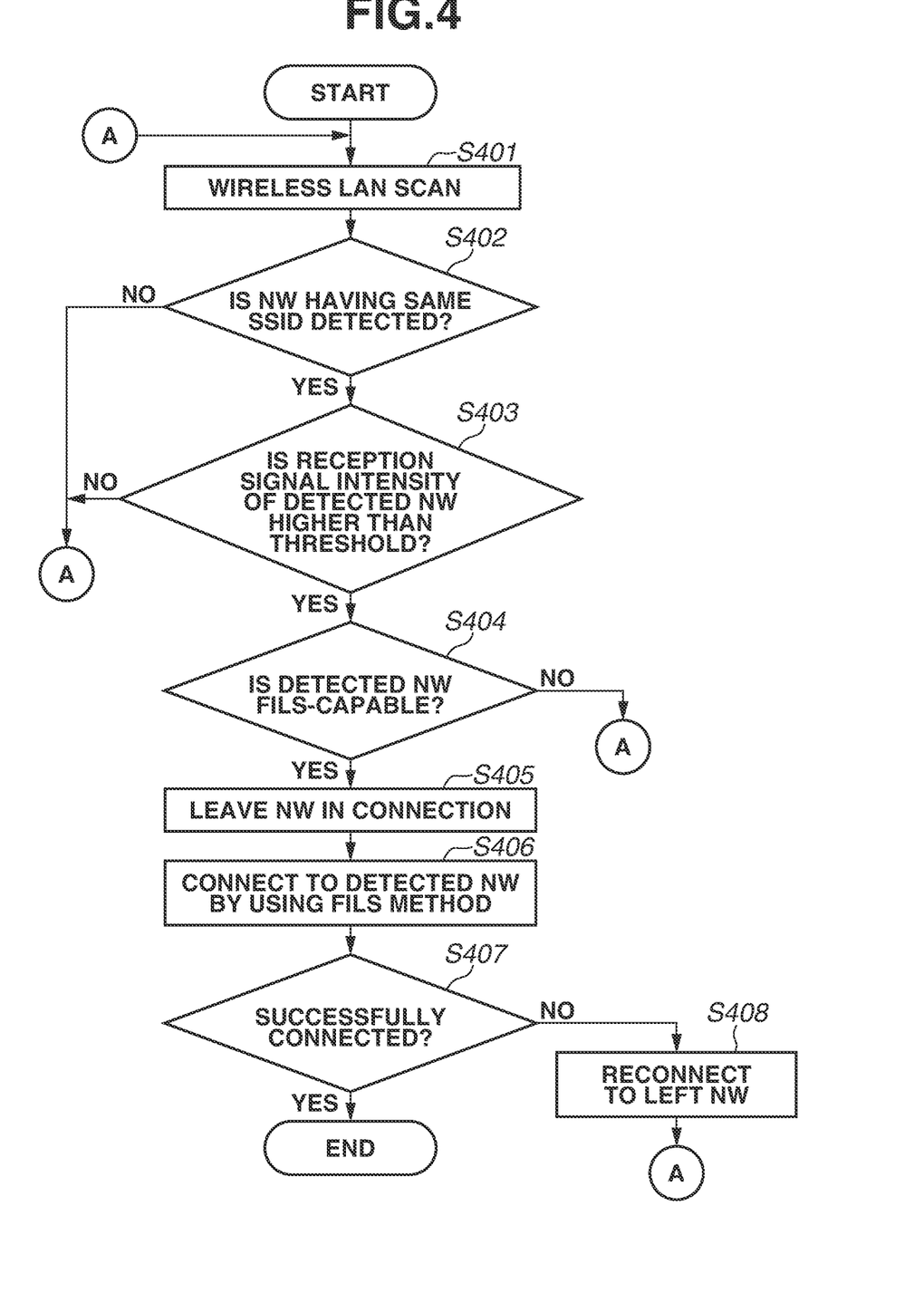
FIG. 4 is a flowchart implemented by the communication apparatus.

FIG. 4 illustrates a flowchart to be started when the communication apparatus 101 is connected to a wireless network (here, network 112). The flowchart may be started if the communication apparatus 101 is in connection with a wireless network and a predetermined instruction (such as a wireless network search instruction) is given by the user. The flowchart may be started if the reception signal intensity of a signal from the base station constructing the wireless network with which the communication apparatus 101 is in connection falls below a predetermined threshold. The flowchart may be started if a predetermined time has elapsed since the connection of the communication apparatus 101 to the wireless network, or if the communication apparatus 101 has moved by a predetermined distance since the connection to the wireless network. The flowchart may be started based on a combination of such conditions.

The flowchart illustrated in FIG. 4 is implemented by the control unit 202 reading and executing a program stored in the storage unit 201 of the communication apparatus 101. Part or all of the steps illustrated in the flowchart of FIG. 4 may be implemented by hardware such as an application specific integrated circuit (ASIC). In the flowchart, a network will be referred to simply as "NW".

If the flowchart illustrated in FIG. 4 is started, then in step S401, the communication apparatus 101 performs a wireless LAN scan to detect wireless networks existing around. For the wireless LAN scan, the communication apparatus 101 detects wireless networks by transmitting a probe request signal (Probe Request) and receiving probe response signals (Probe Response) from base stations receiving the probe request signal. Such a method is referred to as active scanning. However, this is not restrictive. Passive scanning in which the communication apparatus 101 detects wireless networks by receiving beacon signals (Beacon) transmitted from base stations may be used.

If, as a result of the wireless LAN scan, no network having the same SSID as that of the wireless network in which the communication apparatus 101 is currently participating is detected (NO in step S402), the processing returns to step S401. In step S401, the communication apparatus 101 retries a wireless LAN scan. In retrying a wireless LAN scan, the communication apparatus 101 may wait for a certain time before retrying the wireless LAN scan so that processing load does not increase because wireless LAN scans are successively performed in a short time. If, in any of the steps to be described below, the processing returns to step S401 and the communication apparatus 101 retries a wireless LAN scan, the communication apparatus 101 may also wait for a certain time before retrying the wireless LAN scan.

On the other hand, if a wireless network having the same SSID is detected (YES in step S402), the processing proceeds to step S403. In step S403, the communication apparatus 101 compares the reception signal intensity of the signal received from the base station constructing the detected wireless network with a threshold stored in the storage unit 201 in advance. In the flowchart, the "reception signal intensity of the signal received from the base station constructing the detected wireless network" is referred to simply as "reception signal intensity of detected NW".

The threshold is a value indicating a reception signal intensity for checking whether communication with the detected base station can be performed with a sufficient field intensity, and is stored in the storage unit 201 in advance. The reception signal intensity is measured by the packet reception unit 302. The threshold may be settable by the user, or obtainable from a base station or an external apparatus. The threshold may be the same value as the "predetermined threshold" that can be used as a starting condition of the present flowchart. The threshold may be the reception signal intensity of the signal received from the base station constructing the wireless communication with which the communication apparatus 101 is currently in connection.

If the reception signal intensity is lower than or equal to the threshold (NO in step S403), the processing returns to step S401. In step S401, the communication apparatus 101 retries a wireless LAN scan. Alternatively, if the reception signal intensity is equal to the threshold, it may be determined YES in step S403 and the processing may proceed to S404.

If the reception signal intensity is higher than the threshold (YES in step S403), the processing proceeds to step S404. In step S404, the communication apparatus 101 analyzes the content of the signal received from the base station, and determines whether the wireless network constructed by the base station is capable of connection using the FILS method. Suppose here that the signal transmitted from the base station (such as Beacon and Probe Response) includes bit information (FILS bit) indicating whether the wireless network constructed by the base station is capable of connection using the FILS method. The communication apparatus 101 determines whether the wireless network is capable of connection using the FILS method, by referring to the bit information. Being capable of connection using the FILS method will hereinafter be referred to as being FILS-capable. Being incapable of connection using the FILS method will be referred to as not being FILS-capable.

If the detected wireless network is not FILS-capable (NO in step S404), the processing returns to step S401. In step S401, the communication apparatus 101 retries a wireless LAN scan. On the other hand, if the detected wireless network is FILS-capable (YES in step S404), the processing proceeds to step S405. In step S405, the communication apparatus 101 leaves the wireless network in connection. In step S406, the communication apparatus 101 performs connection processing for connecting to the detected wireless network by using the FILS method. Specifically, the communication apparatus 101 transmits and receives messages compliant with the FILS method to/from the base station constructing the wireless network, and performs authentication processing and IP address assignment processing.

If the connection processing in step S406 fails, i.e., the connection to the wireless network is not normally completed (NO in step S407), the processing proceeds to step S408. In step S408, the communication apparatus 101 performs reconnection processing with the wireless network left in step S405. In the reconnection processing, like in step S404, the communication apparatus 101 determines whether the wireless network to be reconnected is FILS-capable. If the wireless network is FILS-capable, the communication apparatus 101 performs the reconnection processing by using the FILS method. On the other hand, if the wireless network is not FILS-capable, the communication apparatus 101 performs the reconnection processing by using WPA-Enterprise and DHCP. After the reconnection processing, the processing returns to step S401. In step S401, the communication apparatus 101 retries a wireless LAN scan.

On the other hand, if the connection processing in step S406 is successful (YES in step S407), the wireless LAN handover processing ends. That is, the processing illustrated in FIG. 4 ends. If the wireless LAN handover processing ends, the processing may return to step S401 so that the communication apparatus 101 may retry a wireless LAN scan. The processing illustrated in FIG. 4 may be started again according to the foregoing starting condition.

Figure 5:
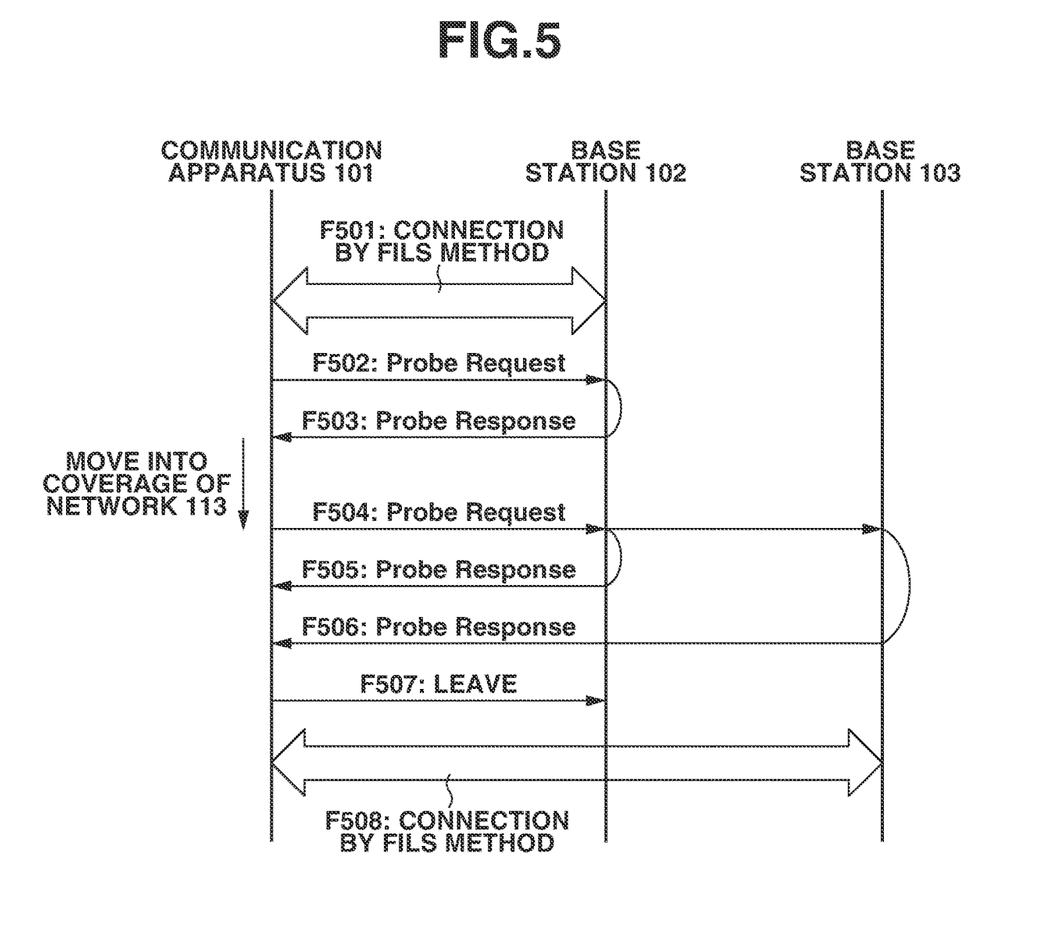
FIG. 5 is an operation sequence diagram during handover processing.

FIG. 5 illustrates a sequence of processing implemented between the communication apparatus 101 and the base stations 102 and 103.

In F501, the communication apparatus 101 initially performs connection processing by the FILS method with the network 112 constructed by the base station 102. In response to the completion of the connection processing, the communication apparatus 101 starts the wireless LAN handover processing (FIG. 4).

In step S401, the communication apparatus 101 performs a wireless LAN scan. In F502, the communication apparatus 101 broadcasts a probe request signal. In F503, the communication apparatus 101 receives a probe response signal from the base station 102. At this point in time, the communication apparatus 101 lies outside the coverage of the network 113 constructed by the base station 103. The communication apparatus 101 therefore does not receive a probe response signal from the base station 103.

The communication apparatus 101 then moves into the coverage of the network 113. In F504, the communication apparatus 101 broadcasts a probe request signal again. After the broadcast, in F505 and F506, the communication apparatus 101 receives probe response signals from the base stations 102 and 103. The probe response signal received in F506 includes, as the SSID of the network 113, the same SSID information as that of the network 112. The probe response signal also includes information indicating that the network 113 is capable of connection processing using the FILS method. Suppose that the reception signal intensity of this probe response signal is higher than the threshold described in step S403 of FIG. 4.

In steps S402, S403, and S404, the communication apparatus 101 checks that the network 113 is a wireless network satisfying a handover condition (YES in step S404), based on the content and the reception signal intensity of the received probe response signal. In F507, the communication apparatus 101 leaves the network 112 in connection. The communication apparatus 101 here transmits a disassociation signal for requesting disconnection of the wireless communication to the base station 102. In F508, the communication apparatus 101 performs connection processing with the network 113 by using the FILS method.

As described above, according to the present exemplary embodiment, the communication apparatus 101 can switch whether to perform handover processing according to whether the candidate wireless network for handover is capable of connection using the FILS method. This enables quick switching of the wireless network to connect to while preventing the occurrence of a prolonged communication-disabled period because of the handover processing, and thus improves user convenience.

In the first exemplary embodiment, a method for performing handover processing only on a FILS-capable wireless network has been described. In a second exemplary embodiment, a method for performing handover processing even on a not FILS-capable wireless network depending on situations will be described. A configuration of a communication system according to the present exemplary embodiment and a hardware configuration and software function blocks of a communication apparatus 101 are similar to those of the first exemplary embodiment. A description thereof will thus be omitted.

Figure 6:
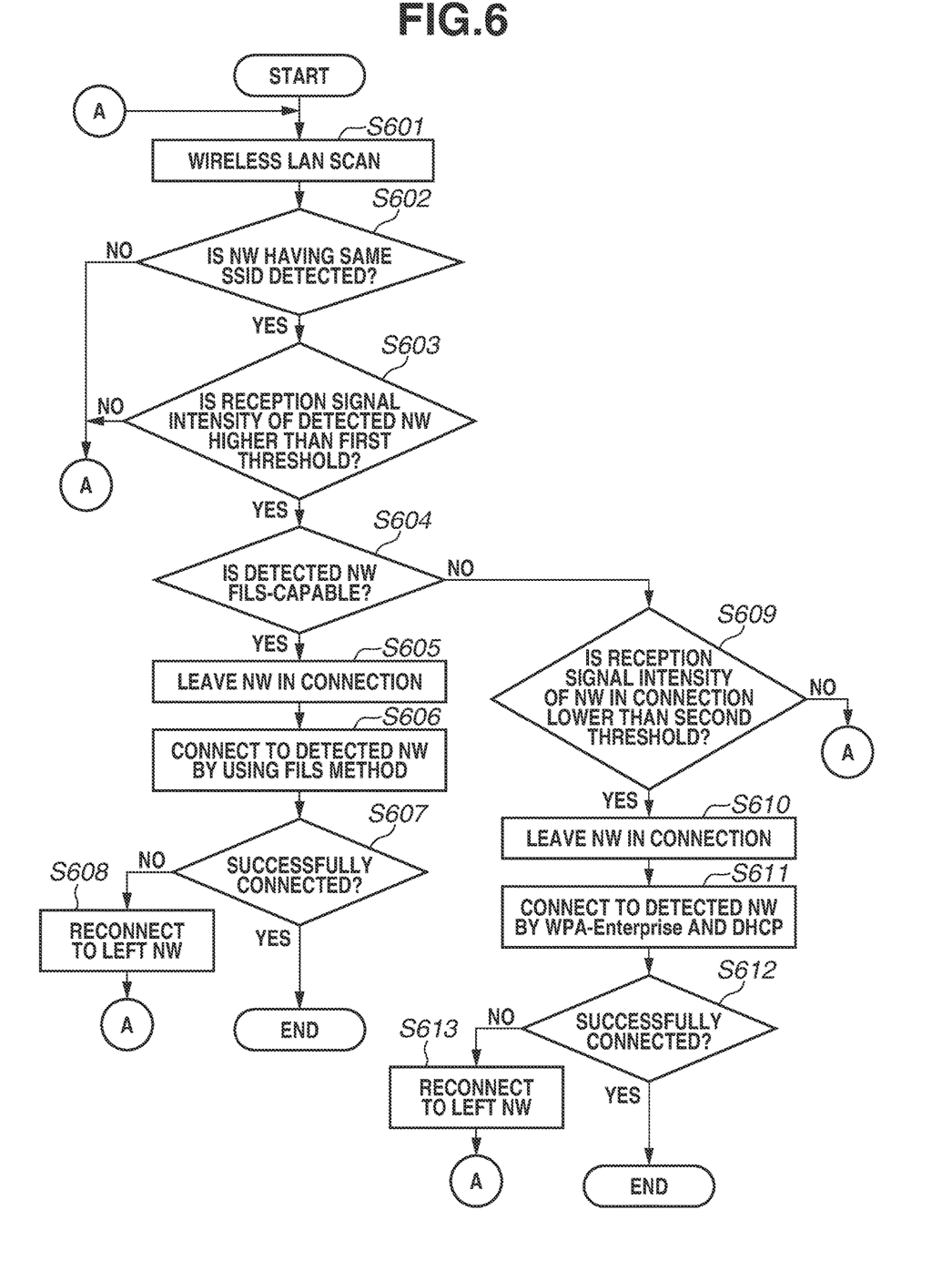
FIG. 6 is a flowchart implemented by a communication apparatus.

FIG. 6 illustrates a flowchart implemented by the control unit 202 reading and executing a program stored in the storage unit 201 of the communication apparatus 101. The starting condition of the flowchart is similar to that of FIG. 4.

Steps S601 to S608 of FIG. 6 are similar to steps S401 to S408 of FIG. 4, respectively. A description thereof will thus be omitted. Now, an operation in a case where the wireless network detected in step S601 is not FILS-capable (NO in step S604) will be described below.

If the wireless network is not FILS-capable (NO in step S604), the processing proceeds to step S609. In step S609, the communication apparatus 101 compares the reception signal intensity of the signal received from the base station constructing the wireless network currently in connection and a predetermined threshold. Here, the reception signal intensity is compared with a second threshold different from the threshold (referred to as a first threshold) used in the comparison of step S603. The second threshold is lower than the first threshold. The second threshold may be stored in the storage unit 201 in advance. The second threshold may be settable by the user, or obtainable from a base station or an external apparatus. A value having a predetermined difference from the first threshold may be used as the second threshold.

If the reception signal intensity is higher than or equal to the second threshold (NO in step S609), the processing returns to step S601. In step S601, the communication apparatus 101 retries a wireless LAN scan. On the other hand, if the reception signal intensity is lower than the second threshold (YES in step S609), the processing proceeds to step S610. In step S610, the communication apparatus 101 leaves the wireless network in connection. Alternatively, if the reception signal intensity is equal to the second threshold, it may be determined YES in step S609 and the processing may proceed to S610. In step S611, the communication apparatus 101 having left the wireless network performs connection processing for connecting to the detected wireless network according to the WPA-Enterprise method. In step S611, after the completion of authentication by the WPA-Enterprise method, the communication apparatus 101 performs IP address assignment processing by DHCP.

If the connection processing in step S611 fails (NO in step S612), the processing proceeds to step S613. In step S613, the communication apparatus 101 performs reconnection processing with the wireless network left in step S610. The processing then returns to step S601. On the other hand, if the connection processing in step S606 is successful (YES in step S612), the wireless LAN handover processing illustrated in FIG. 6 ends.

If the wireless LAN handover processing ends, the processing may return to step S601 so that the communication apparatus 101 may retry a wireless LAN scan. The processing illustrated in FIG. 6 may be started again according to the foregoing starting condition.

Figure 7:
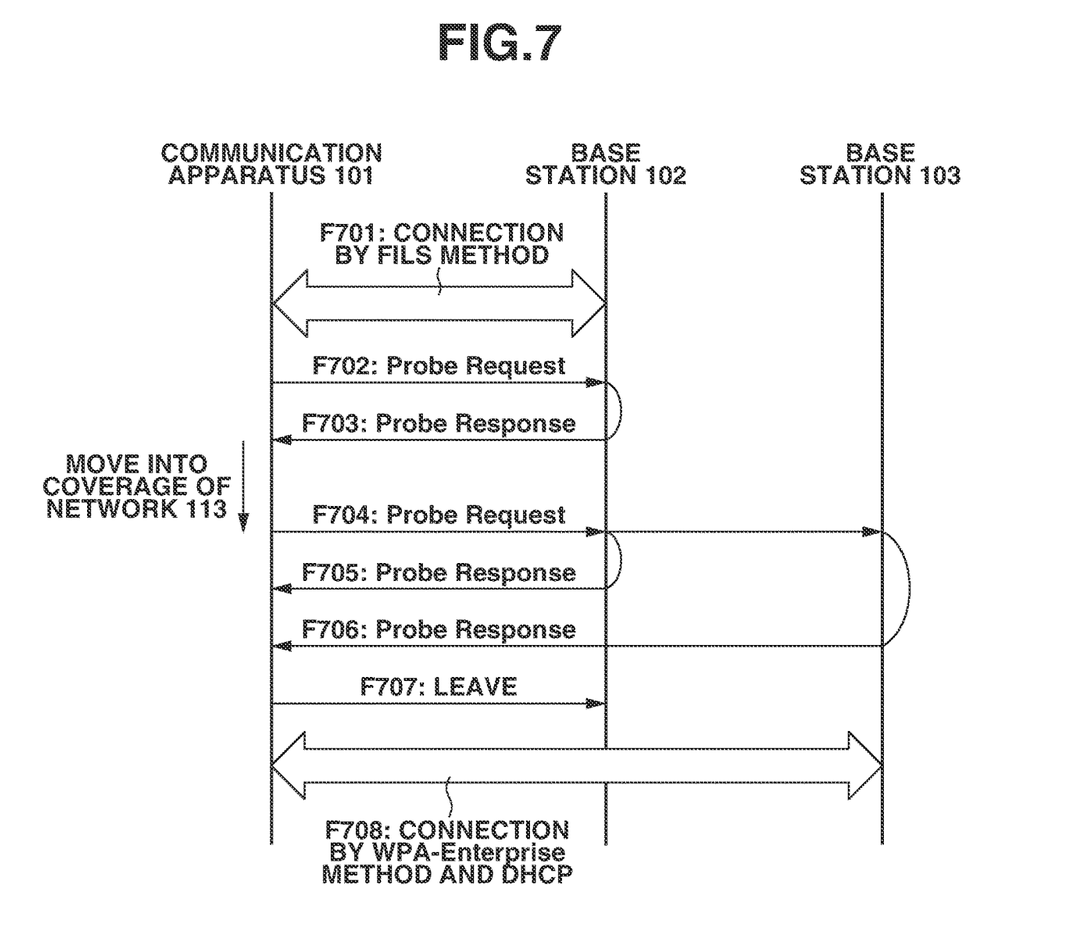
FIG. 7 is an operation sequence diagram during handover processing.

FIG. 7 illustrates a sequence of processing implemented between the communication apparatus 101 and the base stations 102 and 103. In the present exemplary embodiment, suppose that the base station 103 does not support 11ai, and the communication apparatus 101 is unable to perform connection processing by the FILS method with the network 113.

In F701, the communication apparatus 101 initially performs connection processing by the FILS method with the network 112 constructed by the base station 102. In response to the completion of the connection processing, the communication apparatus 101 starts the wireless LAN handover processing (FIG. 6).

In step S601, the communication apparatus 101 performs a wireless LAN scan. In F702, the communication apparatus 101 broadcasts a probe request signal. In F703, the communication apparatus 101 receives a probe response signal from the base station 102. At this point in time, the communication apparatus 101 lies outside the coverage of the network 113 constructed by the base station 103. The communication apparatus 101 therefore does not receive a probe response signal from the base station 103.

The communication apparatus 101 then moves into the coverage of the network 113. In F704, the communication apparatus 101 broadcasts a probe request signal again. After the broadcast, in F705 and F706, the communication apparatus 101 receives probe response signals from the base stations 102 and 103.

The probe response signal received from the base station 103 in F706 includes, as the SSID of the network 113, the same SSID information as that of the network 112. The probe response signal also includes information indicating that the network 113 is not capable of connection processing using the FILS method. Suppose that the reception signal intensity of the probe response signal is higher than the first threshold. Suppose also that the reception signal intensity of the probe response signal received from the base station 102 in F705 is lower than the second threshold.

Based on the content and the reception signal intensities of the received probe response signals, the communication apparatus 101 determines that the network 113 is not capable of connection processing using the FILS method (NO in step S604), and to switch the connection destination (YES in step S609).

In F707, the communication apparatus 101 then leaves the network 112 in connection. The communication apparatus 101 here transmits a disassociation signal for requesting disconnection of wireless communication to the base station 102. In F708, the communication apparatus 101 performs connection processing with the network 113 by using the WPA-Enterprise. Specifically, the communication apparatus 101 performs the connection processing by transmitting and receiving messages compliant with the WPA-Enterprise method and DHCP to/from the base station 103.

As described above, according to FIGS. 6 and 7, if the field intensity from the base station in connection is insufficient and the detected wireless network is not capable of FILS (11ai), the communication apparatus 101 performs handover processing. As a result, the communication apparatus 101 can perform communication in a better radio wave environment while preventing deterioration in communication performance, such as a drop in communication speed, due to a lower field intensity resulting from staying in the wireless network in connection.

In step S609, the communication apparatus 101 may determine whether the field intensity from the base station constructing the detected network is lower than a third threshold. The third threshold is a value greater than the first threshold. If the field intensity from the base station constructing the detected network is lower than the third threshold, the processing returns to step S601. On the other hand, if the field intensity from the base station constructing the detected network is higher than or equal to the third threshold, the processing proceeds to step S610.

With such a configuration, if the detected wireless network is FILS-capable, handover processing can be performed based on the first threshold. If the detected wireless network is not FILS-capable, handover processing can be performed based on the third threshold which is higher than the first threshold. In such a manner, whether to perform handover processing can be determined based on different thresholds depending on whether the detected wireless network is FILS-capable. In particular, since the third threshold has a value greater than the first threshold, handover processing is more likely to be performed with a FILS-capable wireless network than with a not FILS-capable one.

A third exemplary embodiment describes a method for performing, if connection processing using the FILS method with a detected wireless network fails, connection using the WPA-Enterprise method depending on the field intensity from the base station constructing the previously-connected wireless network. A configuration of a communication system according to the present exemplary embodiment and a hardware configuration and software function blocks of a communication apparatus 101 are similar to those of the first exemplary embodiment. A description thereof will thus be omitted.

Figure 8:
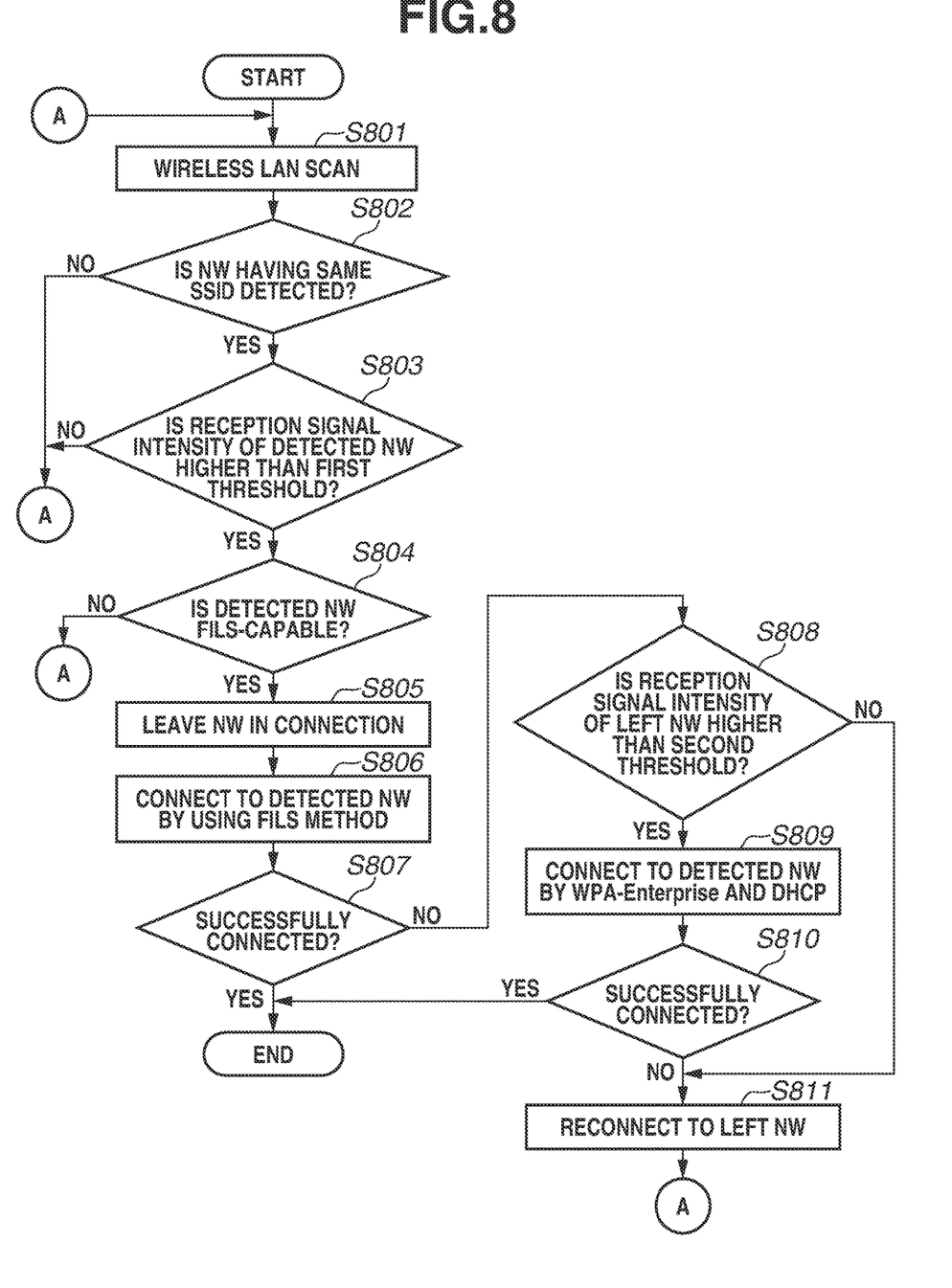
FIG. 8 is a flowchart implemented by a communication apparatus.

FIG. 8 illustrates a flowchart implemented by the control unit 202 reading and executing a program stored in the storage unit 201 of the communication apparatus 101. The starting condition of the flowchart is similar to that of FIG. 4.

Steps S801 to S807 of FIG. 8 are similar to steps S401 to S407 of FIG. 4, respectively. A description thereof will thus be omitted. Now, an operation in a case where the connection processing using the FILS method with the wireless network detected in step S801 fails (NO in step S807) will be described. The connection processing using the FILS method can fail in cases such as when the settings of the authentication processing using the FILS method are not properly made in the base station. Without the proper settings of the authentication processing using the FILS method, the connection processing using FILS fails even if the base station transmits a signal including information indicating that the wireless network is capable of connection processing using the FILS method.

If the connection processing using the FILS method fails (NO in step S807), the processing proceeds to step S808. In step S808, the communication apparatus 101 compares the reception signal intensity of the signal received from the base station constructing the wireless network left in step S805 with a predetermined threshold. Here, a value similar to the second threshold according to the second exemplary embodiment is used as the predetermined threshold.

If the reception signal intensity is lower than or equal to the second threshold (NO in step S808), the processing proceeds to step S811. In step S811, the communication apparatus 101 reconnects to the wireless network left in step S805. The processing then returns to step S801. On the other hand, if the reception signal intensity is higher than the second threshold (YES in step S808), the processing proceeds to step S809. In step S809, the communication apparatus 101 performs connection processing for connecting to the wireless network left in step S805. Here, the communication apparatus 101 transmits and receives messages according to the WPA-Enterprise method to/from the base station constructing the wireless network and connects to the base station. The communication apparatus 101 then performs IP address assignment processing by DHCP with the base station. Alternatively, if the reception signal intensity is equal to the second threshold, it may be determined YES in step S808 and the processing may proceed to step S809.

If the connection processing in step S809 fails (NO in step S810), the processing proceeds to step S811. In step S811, the communication apparatus 101 reconnects to the wireless network left in step S805. The processing then returns to step S801. On the other hand, if the connection processing in step S809 is successful (YES in step S810), the wireless LAN handover processing illustrated in FIG. 8 ends.

If the wireless LAN handover processing ends, the processing may return to step S801 so that the communication apparatus 101 may retry a wireless LAN scan. The processing illustrated in FIG. 8 may be started again according to the foregoing starting condition.

Figure 9:
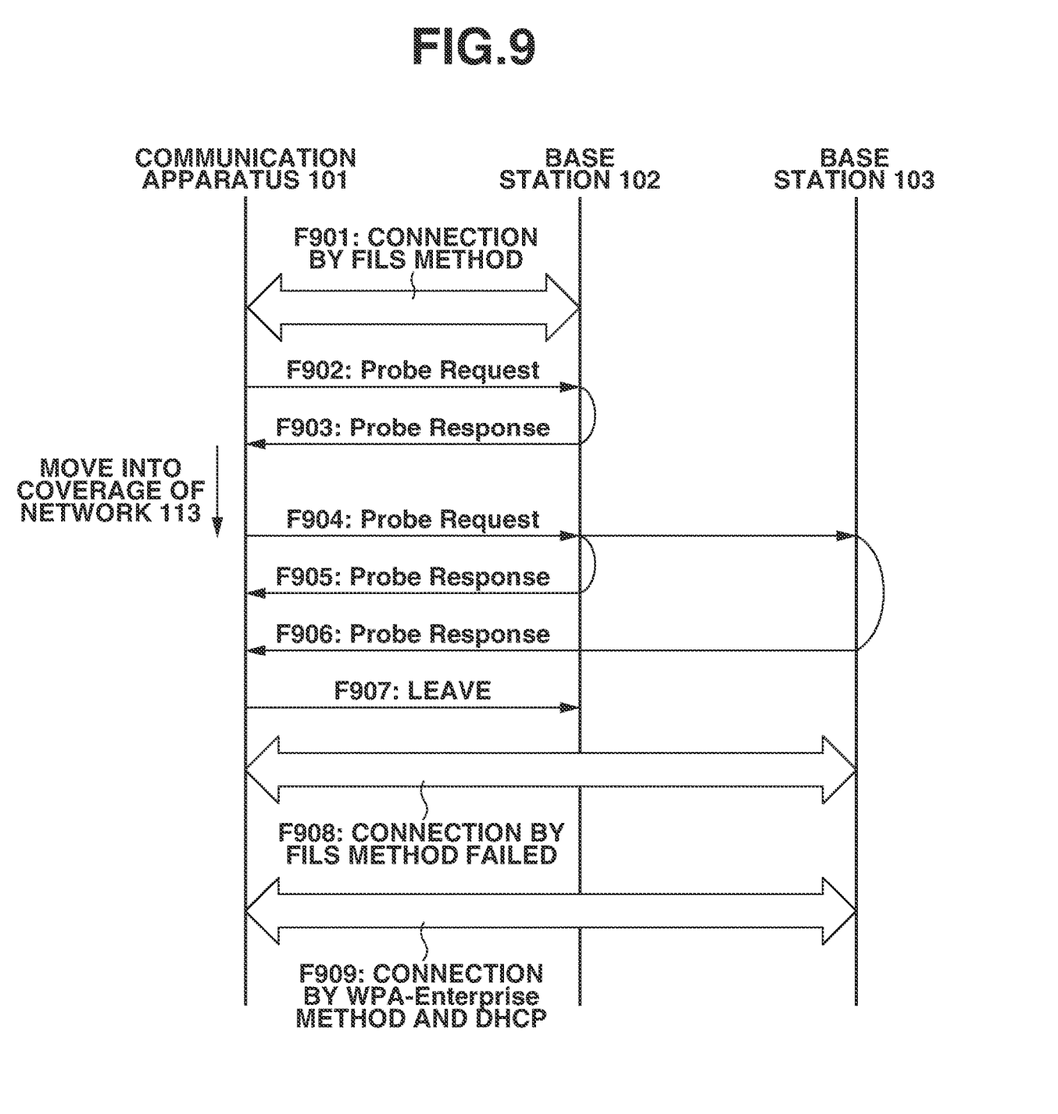
FIG. 9 is an operation sequence diagram during handover processing.

FIG. 9 illustrates a sequence of processing implemented between the communication apparatus 101 and the base stations 102 and 103. In the present exemplary embodiment, the base stations 102 and 103 support 11ai. The communication 101 can perform connection processing by the FILS method with the networks 112 and 113.

In F901, the communication apparatus 101 initially performs connection processing by the FILS method with the network 112 constructed by the base station 102. In response to the completion of the connection processing, the communication apparatus 101 starts the wireless LAN handover processing (FIG. 8).

In step S801, the communication apparatus 101 performs a wireless LAN scan. In F902, the communication apparatus 101 broadcasts a probe request signal. In F903, the communication apparatus 101 receives a probe response signal from the base station 102. At this point in time, the communication apparatus 101 lies outside the coverage of the network 113 constructed by the base station 103. The communication apparatus 101 therefore does not receive a probe response signal from the base station 103.

The communication apparatus 101 then moves into the coverage of the network 113. In F904, the communication apparatus 101 broadcasts a probe request signal again. After the broadcast, in F905 and F906, the communication apparatus 101 receives probe response signals from the base stations 102 and 103.

The probe response signal received from the base station 103 in F906 includes, as the SSID of the network 113, the same SSID information as that of the network 112. The probe response signal also includes information indicating that the network 113 is capable of connection processing using the FILS method. Suppose that the reception signal intensity of the probe response signal is higher than the first threshold. Suppose also that the reception signal intensity of the probe response signal received from the base station 102 in F905 is lower than the second threshold.

Based on the content and the reception signal intensities of the received probe response signals, the communication apparatus 101 determines to switch the connection destination to the network 113 (YES in step S804). In F907, the communication apparatus 101 leaves the network 112 in connection. Here, the communication apparatus 101 transmits a disassociation signal for requesting disconnection of wireless communication to the base station 102. In F908, the communication apparatus 101 performs connection processing with the network 113 by using the FILS method.

Suppose here that the connection processing by the FILS method fails. After the failure of the connection processing, the communication apparatus 101 determines to retry connection processing with the base station 103 (YES in step S808). The communication apparatus 101 then performs connection processing with the network 113 by using WPA-Enterprise. Specifically, in F909, the communication apparatus 101 performs the connection processing by transmitting and receiving messages compliant with the WPA-Enterprise method and DHCP to/from the base station 103.

As described above, according to FIGS. 8 and 9, the communication apparatus 101, after a failure of connection processing by the FILS method, performs handover processing again with the connection-failed wireless network depending on the field intensity from the base station constructing the previously-connected wireless network. The communication apparatus 101 can thereby perform communication in a better radio wave environment while preventing deterioration in communication performance due to not performing handover even if the handover processing using the FILS method fails.

The first to third exemplary embodiments have been described above. According to the foregoing exemplary embodiments, the communication apparatus 101 automatically performs a wireless LAN handover by the FILS method with FILS (11ai)-capable wireless networks (base stations). The communication apparatus 101 can thereby achieve seamless data communication without the user's awareness of which base station is in connection.

The exemplary embodiments may be combined as appropriate. For example, if NO in step S804 of FIG. 8, the processing may proceed to step S609 of FIG. 6. Which processing to perform may be switched according to user settings or a state of the communication apparatus 101.

In the foregoing exemplary embodiments, in step S609 of FIG. 6 and step S808 of FIG. 8, the communication apparatus 101 determines whether to perform handover based on the second threshold. However, the communication apparatus 101 may instead, or additionally, make the determination according to whether the communication apparatus 101 is communicating data (data communication is in process) via the wireless network in connection.

Specifically, if data communication is in process (NO in step S609, or NO in step S808), the communication apparatus 101 may avoid performing handover processing. If data communication is not in process (YES in step S609, or YES in step S808), the communication apparatus 101 may perform handover. Whether data communication is in process may be determined based on whether a data packet is currently being transmitted or received, or based on whether there is a communication session established with a specific apparatus. The determination may be made based on the presence or absence of data addressed to a specific apparatus.

Handover processing using the WPA-Enterprise method, which takes longer to establish connection compared to the FILS method, can thereby be performed at timing not affecting data communication. This also improves user convenience.

In the foregoing exemplary embodiments, the communication apparatus 101 determines whether the FILS method is supported, based on the signals from the base stations 102 and 103. However, this is not restrictive. The communication apparatus 101 may determine whether 11ai is supported, based on the signals from the base stations 102 and 103. This can provide similar effects.

In performing handover by the WPA-Enterprise method, the communication apparatus 101 may make the user select whether to perform the handover. Connection by the WPA-Enterprise method, which takes longer to establish connection compared to the FILS method, can thereby be performed with the consent of the user. This also improves user convenience.

In the foregoing exemplary embodiments, a wireless network having the same SSID is detected as the handover-destination wireless network (in steps S402, S602, and S802). However, the communication apparatus 101 may detect a handover-capable wireless network that has a different SSID. In such a case, the determinations in steps S402, S602, and S802 may be YES. For example, if the communication apparatus 101 stores, in the storage unit 201, communication parameters needed to connect to a wireless network, the wireless network is a handover-capable one. Examples of the communication parameters include an encryption key (for example, passphrase) used in the wireless network and information about an encryption method and authentication method used in the wireless network. Even in such a case, one or more effects described above can be obtained.

The exemplary embodiments of the present invention can be implemented by processing for supplying a program for implementing one or more functions of the foregoing exemplary embodiments to a system or an apparatus via a network or a storage medium, and reading and executing the program by one or more processors of a computer of the system or apparatus. An exemplary embodiment of the present invention can also be implemented by a circuit (for example, an ASIC) that implements the one or more functions.

According to an exemplary embodiment of the present invention, handover processing can be performed in consideration of whether the handover-destination wireless network is capable of connection using the FILS method.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-226811, filed Nov. 27, 2017, which is hereby incorporated by reference herein in its entirety.

What is claimed is:

1. A communication apparatus comprising:
one or more processors; and
one or more memories including instructions that, when executed by the one or more processors, cause the communication apparatus to:
detect, when the communication apparatus is in a first wireless network, a second wireless network different from the first wireless network;
determine, in a case where the second wireless network is detected, whether the second wireless network has a function for a Fast Initial Link Setup (FILS) method for connecting;
check whether the communication apparatus is communicating data in the first wireless network; and
control handover processing for switching a connection from the first wireless network to the second wireless network so that:
(1) the handover processing is performed if the communication apparatus is not communicating data in the first wireless network on condition that the communication apparatus is not communicating data in the first wireless network in a case where it is determined that the second wireless network does not have the function, and
(2) the handover processing is performed even if the communication apparatus is communicating data in the first wireless network not on condition that the communication apparatus is not communicating data in the first wireless network in a case where it is determined that the second wireless network has the function.

2. The communication apparatus according to claim 1, wherein the communication apparatus detects the second wireless network having the same service set identifier (SSID) as that of the first wireless network.

3. The communication apparatus according to claim 1, wherein, in a case where it is determined that the second wireless network has the function, the communication apparatus performs the handover processing by using the FILS method.

4. The communication apparatus according to claim 3, wherein, in a case where the handover processing fails, the communication apparatus performs connection processing with the second wireless network by using a Wi-Fi Protected Access (WPA)-Enterprise method.

5. The communication apparatus according to claim 4, wherein, in a case where the connection processing with the second wireless network fails, the communication apparatus performs reconnection processing with the first wireless network.

6. The communication apparatus according to claim 5, wherein, in a case where the first wireless network has the function, the communication apparatus performs the reconnection processing with the first wireless network by using the FILS method.

7. The communication apparatus according to claim 1, wherein, in a case where the handover processing fails, the communication apparatus performs reconnection processing with the first wireless network.

8. The communication apparatus according to claim 7, wherein, in a case where the first wireless network has the function, the communication apparatus performs the reconnection processing with the first wireless network by using the FILS method.

9. The communication apparatus according to claim 1, wherein, in a case where it is determined that the second wireless network does not have the function, the communication apparatus performs the handover processing by using a WPA-Enterprise method.

10. The communication apparatus according to claim 1, wherein the communication apparatus determines whether the second wireless network has the function, based on information included in a Beacon or Probe Response from a base station constructing the second wireless network.

11. A method for controlling a communication apparatus, comprising:
   detecting, when the communication apparatus is in a first wireless network, a second wireless network different from the first wireless network;
   determining whether the detected second wireless network has a function for a Fast Initial Link Setup (FILS) method for connecting;
   checking whether the communication apparatus is communicating data in the first wireless network; and
   controlling handover processing for switching a connection from the first wireless network to the second wireless network so that:
   (1) the handover processing is performed if the communication apparatus is not communicating data in the first wireless network on condition that the communication apparatus is not communicating data in the first wireless network in a case where it is determined that the second wireless network does not have the function, and
   (2) the handover processing is performed even if the communication apparatus is communicating data in the first wireless network not on condition that the communication apparatus is not communicating data in the first wireless network in a case where it is determined that the second wireless network has the function.

12. A non-transitory computer-readable storage medium storing a computer program for causing a computer to execute a process for controlling a communication apparatus, the process comprising:
   detecting, when the communication apparatus is in a first wireless network, a second wireless network different from the first wireless network;
   determining whether the detected second wireless network has a function for a Fast Initial Link Setup (FILS) method for connecting;
   checking whether the communication apparatus is communicating data in the first wireless network; and
   controlling handover processing for switching a connection from the first wireless network to the second wireless network so that:
   (1) the handover processing is performed if the communication apparatus is not communicating data in the first wireless network on condition that the communication apparatus is not communicating data in the first wireless network in a case where it is determined that the second wireless network does not have the function, and
   (2) the handover processing is performed even if the communication apparatus is communicating data in the first wireless network not on condition that the communication apparatus is not communicating data in the first wireless network in a case where it is determined that the second wireless network has the function.

* * * * *